(12) United States Patent  
Boyd et al.

(10) Patent No.: US 6,513,982 B2
(45) Date of Patent: Feb. 4, 2003

(54) PACKAGE BEARING WITH LUBRICATION PORTS

(75) Inventors: Steven V. Boyd, Louisville, OH (US); Marcus Bunnow, Decatur, IL (US)

(73) Assignee: The Timken Company, Canton, OH (US)

( * ) Notice: Subject to any disclaimer, the term of this patent is extended or adjusted under 35 U.S.C. 154(b) by 20 days.

(21) Appl. No.: 09/870,236

(22) Filed: May 30, 2001

(65) Prior Publication Data

US 2002/0181816 A1 Dec. 5, 2002

(51) Int. Cl.$^7$ ............................................. F16C 33/66
(52) U.S. Cl. ........................................................ 384/475
(58) Field of Search ................................ 384/471, 473, 384/474, 475; 74/467, 417

(56) References Cited

U.S. PATENT DOCUMENTS

| | | | |
|---|---|---|---|
| 2,019,464 A | | 10/1935 | Riblet |
| 2,037,206 A | | 4/1936 | Boden |
| 2,040,793 A | | 5/1936 | Peterman |
| 2,147,146 A | | 2/1939 | Carlson et al. |
| 2,152,771 A | | 4/1939 | Ormsby |
| 3,298,760 A | | 1/1967 | Linner et al. |
| 4,824,264 A | | 4/1989 | Hoebel ........................ 384/473 |
| 5,009,523 A | * | 4/1991 | Folger et al. ................ 384/475 |
| 5,114,248 A | * | 5/1992 | Harsdorff .................... 384/473 |
| 5,423,399 A | * | 6/1995 | Smith et al. ................. 384/471 |
| 5,484,212 A | * | 1/1996 | Guaraldi et al. ............. 384/473 |
| 5,735,676 A | * | 4/1998 | Loos ........................... 384/473 |
| 5,749,660 A | | 5/1998 | Dusserre-Telmon et al. ..... 384/475 |

FOREIGN PATENT DOCUMENTS

| | | |
|---|---|---|
| DE | 812489 | 8/1951 |
| DE | 19952602 | 5/2001 |
| EP | 1039160 | 9/2000 |

\* cited by examiner

Primary Examiner—Thomas R. Hannon
(74) Attorney, Agent, or Firm—Polster, Lieder, Woodruff & Lucchesi

(57) ABSTRACT

A multi-row rolling element bearing assembly is provided for use in applications, such as differentials. The rolling element bearing assembly includes an inner race defining at least two inner raceways, an outer race defining at least two outer raceways, and a plurality of rolling elements positioned between the inner and outer raceways formed in at least two rows. The bearing assembly includes a novel lubrication system which reduces the maximum temperature attained by the bearing during operation of the bearing and the time spent at that maximum temperature. The lubrication system includes a forced lubrication port connectable to a forced lubrication system, a secondary lubrication port extending from one of said outer surfaces to said radial inner surface, and a tertiary lubrication port. The forced lubrication system delivers lubricant to the bearing through the forced lubrication port. The bearing is partially submerged in lubricant when installed in an application. The secondary lubrication ports are positioned on the bearing to be submerged in the lubricant, and lubricant flows through the secondary lubrication ports into the bearing to maintain a substantially constant level of lubricant in the bearing during operation of the bearing. The tertiary lubrication port is positioned to be above the level of the lubricant so as not to be submerged. Lubricant which is flung from nearby parts of the machine in which the bearing is mounted can enter the bearing through the tertiary ports. Lastly, the outer race is formed as a one-piece, unitary element and includes an integral flange to mount the bearing in the application as well as the outer races which are formed on the inner surface of the outer race.

20 Claims, 6 Drawing Sheets

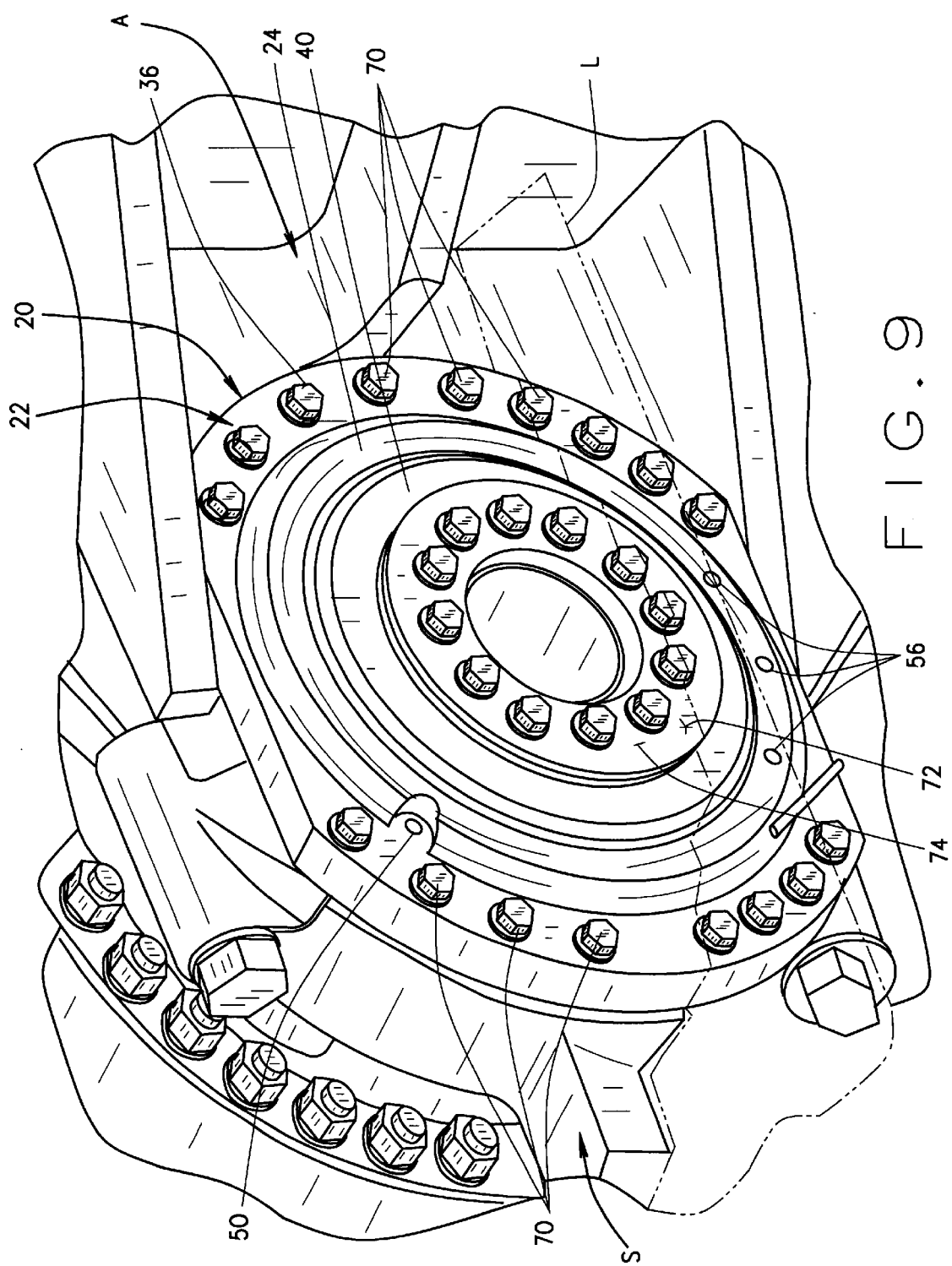

PACKAGE BEARING WITH LUBRICATION PORTS

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

This invention relates in general to rolling element bearings and, more particularly, to an integral race package bearing with an improved lubrication system that allows for cooler operation of the bearing.

Multiple row, rolling element bearing assemblies such as two-row and four-row rolling element bearings are required for certain applications in which greater bearing rating is needed within a limited space. A typical two-row tapered bearing 1 is shown in FIG. 1. The bearing 1 includes a cup carrier 3, bearing outer races or cups 5, tapered rollers 7, and inner races or cones 9. The cup carrier 3 includes a flange to connect or mount the bearing in an application. Typically, the cup carrier 3 for a multiple-row bearing is manufactured separately from the bearing cups 5, and the bearing cups which define the outer race against which the rolling elements rotate, are fitted into the cup carrier. As seen in FIG. 1, the bearing cups for the two rows of rolling elements are formed separately. Thus, there are two rings or bearing cups which are fitted into the cup carrier 3.

The manufacturing of the cup carrier separately from the bearing cups involves several problems or disadvantages. In particular, manufacturing a separate bearing cup carrier to the required tolerances is difficult. In addition, the separate bearing cup carrier requires that the customer perform additional assembly steps after delivery. Further, using separately manufactured parts results in a high tolerance stack-up, leading to larger and therefore less accurate bearing setting ranges that are unacceptable in many applications. As a result, using two single row assemblies to produce a multi-row bearing assembly can be time-consuming and inconvenient for the customer.

Using separate bearing components also complicates the required lubricant delivery in multiple-row bearings. In tapered roller bearings, the arrangement of the bearing components pumps lubricant out from the small end to the large end of the rollers. At higher rates of operating speed, the bearings have a tendency to pump themselves dry. In order for the bearings to operate successfully at higher rates of speed, lubricant must be pumped between the multiple rows of bearings using an external pumping system. The lubricant is typically delivered to the rollers 3 through a single port 11 which is in fluid communication with a plurality of radial holes 13 via a groove 15. However, lubrication solutions are limited in multiple-row bearings with separately manufactured components. With separately manufactured components, relatively little material remains in the bearing or cup carrier for adding lubrication enhancements such as additional or larger diameter lubrication holes without compromising component integrity.

BRIEF SUMMARY OF THE INVENTION

A multi-row rolling element bearing assembly is provided for use in applications, such as differentials. The rolling element bearing assembly includes an inner race defining at least two inner raceways, an outer race defining at least two outer raceways, and a plurality of rolling elements positioned between the inner and outer raceways arranged in at least two rows. Although the bearing is described to have rollers, the rolling elements can be rollers, balls, or other types of rolling elements. The bearing assembly includes a novel lubrication system which reduces the maximum temperature attained by the bearing during operation of the bearing and the time spent at that maximum temperature.

The lubrication system includes a forced lubrication port or passage connectable to a forced lubrication system and a secondary lubrication port or passage. The forced and secondary lubrication ports define channels extending from an outer surface of the bearing assembly to the radial inner surface at a point near the rolling elements. A tertiary lubrication port or passage may also be provided. The forced lubrication system delivers lubricant to the bearing through the forced lubrication port.

When installed in a machine, the bearing is at least partially submerged in lubricant up to a desired level, to define a lubricant level. The secondary lubrication port is positioned below the lubricant level to be submerged in lubricant. Thus, the lubricant passively flows into the bearing through the secondary lubrication ports and the presence of the secondary lubrication ports maintains a substantially constant level of lubricant in the bearing to ensure lubrication of the rolling elements. The tertiary lubrication ports on the bearing are above the lubricant level. Any lubricant which is flung from nearby parts of the machine toward the bearing can enter the bearing through the tertiary lubrication ports.

The forced lubrication port and the secondary lubrication ports are preferably axial ports which are formed on either the front or back surfaces of the outer race, and which open along the inner surface of the outer race between the rolling elements. The tertiary port is preferably a radially extending port which is formed on the radial outer or side surface of the outer race and which opens along the inner surface of the outer race between the rolling elements.

Preferably, there is a single forced lubrication port or passage. The forced lubrication port or passage has only one entrance into the bearing and a single exit from the passage on the inner surface of the outer face. This is compared with the several holes in the prior art bearing through which lubricant is forced. The forced lubrication port is larger in diameter than the forced lubrication ports of prior art bearing assemblies. To facilitate the larger size of the forced lubrication port, as well as the secondary and tertiary ports, the outer race is formed as a one-piece, unitary element. It includes an integral flange to mount the bearing in the application. Additionally, the outer raceways are formed on the inner surface of the outer race. Hence, the use of separate bearing cups is eliminated. The elimination of separate bearing cups substantially reduces the tolerance stack up resulting from assembly of several parts. It also reduces the total cost of use. The actual cost of materials for the bearing assembly is not reduced substantially relative to the prior art bearing assemblies (such as shown in FIG. 1). However, due to the higher life and reliability of our new bearing assembly, and the less frequent replacement of the bearing assemblies, overall operating costs are decreased.

BRIEF DESCRIPTION OF THE SEVERAL VIEWS OF THE DRAWINGS

FIG. 9 is a perspective view of the roller bearing assembly incorporated into an application.

Corresponding reference numerals will be used throughout the several figures of the drawings.

DETAILED DESCRIPTION OF THE INVENTION

Figure 1:
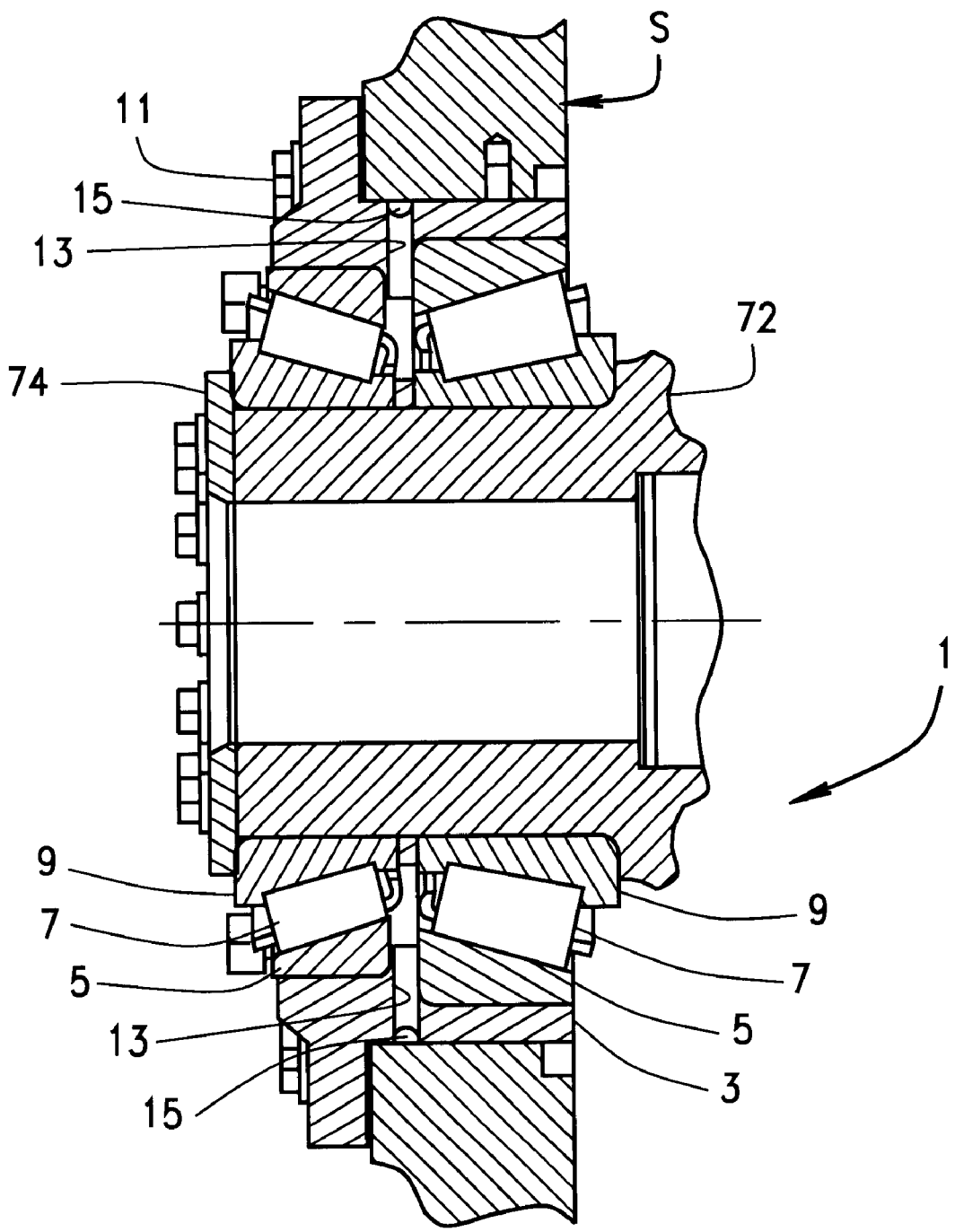
FIG. 1 is a cross-sectional view of a prior art two-row rolling element bearing assembly.
Figure 2:
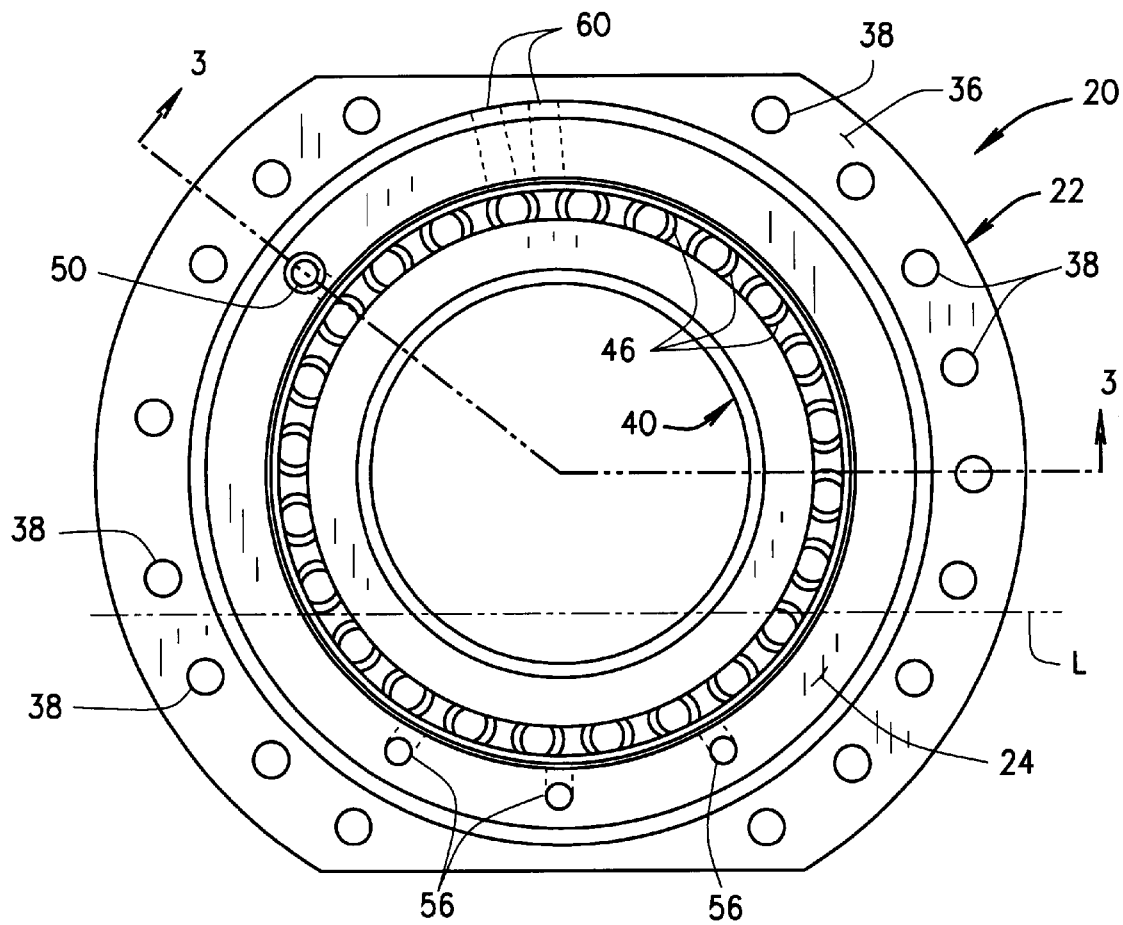
FIG. 2 is a plan view of a two-row rolling element bearing assembly of the present invention.
Figure 3:
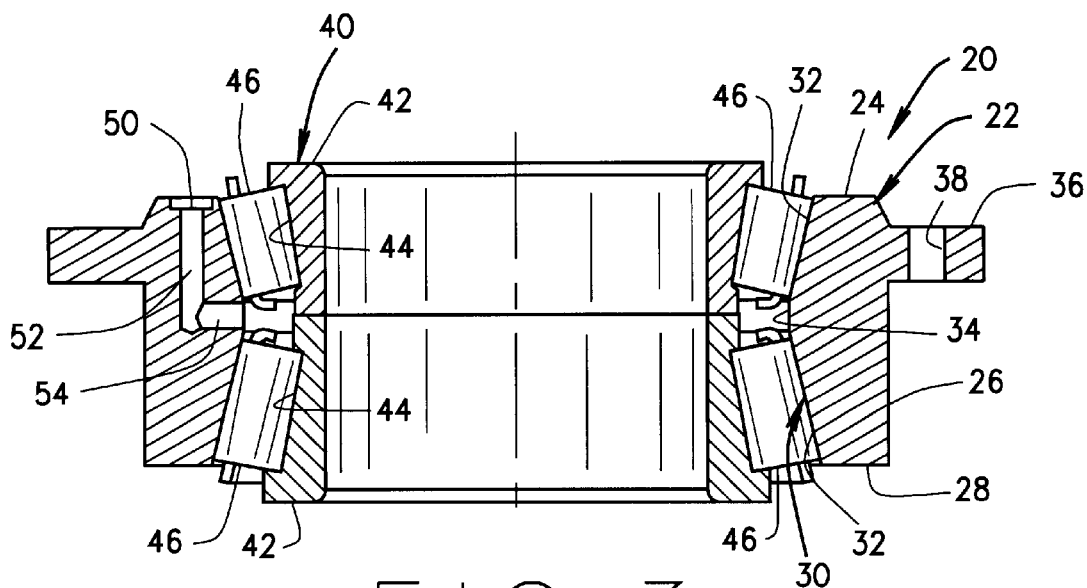
FIG. 3 is a cross-sectional view of the rolling element bearing assembly taken along line 3—3 of FIG. 2.
Figure 4:
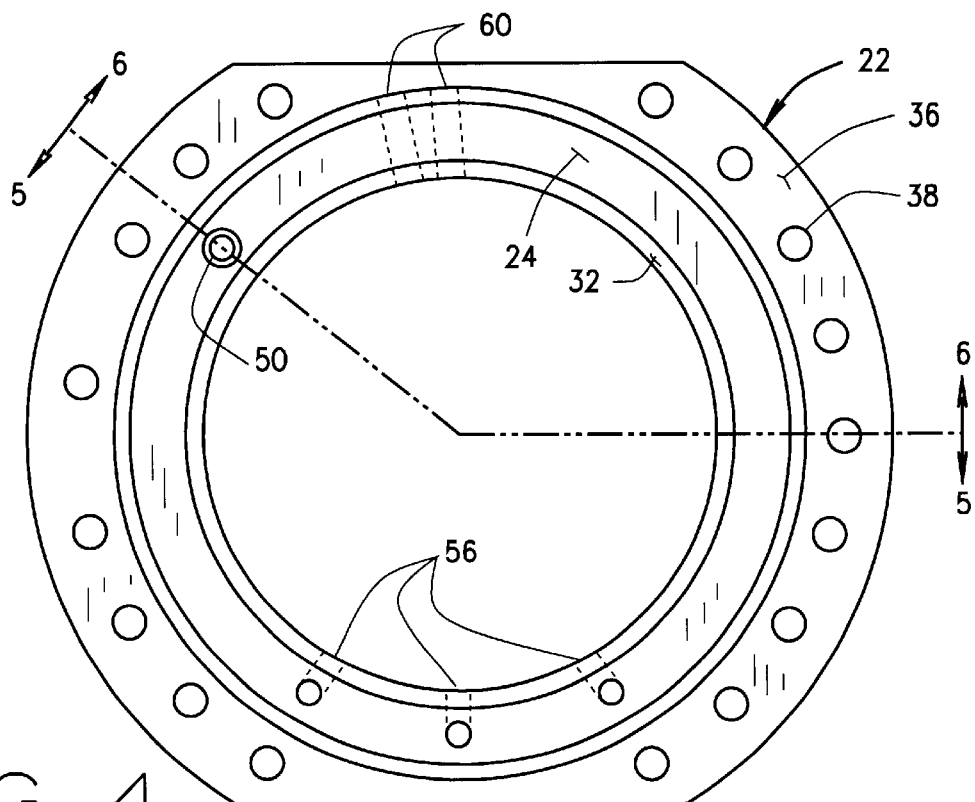
FIG. 4 is a plan view of an integrated, unitary, one-piece outer race of the rolling element bearing assembly which includes an integral mounting flange and the outer raceways.
Figure 5:
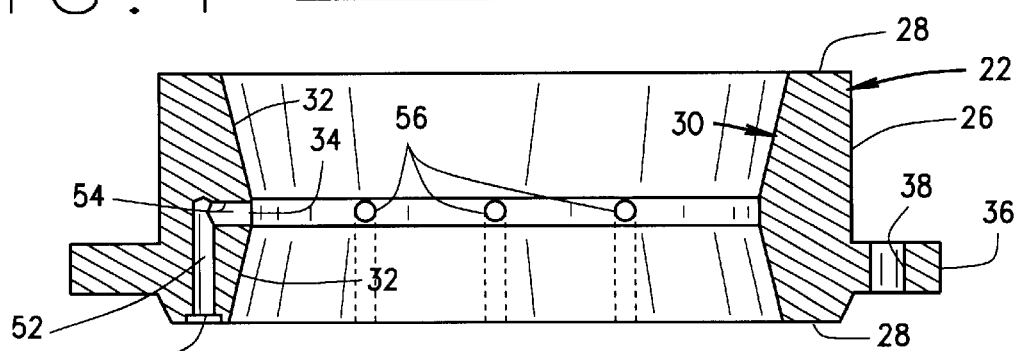
FIG. 5 is a cross-sectional view taken along line 5—5 of FIG. 4.
Figure 6:
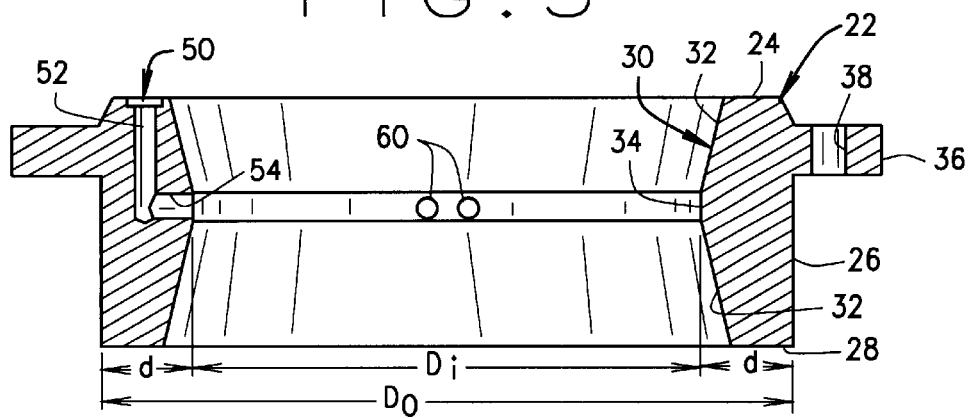
FIG. 6 is a cross-sectional view taken along line 6—6 of FIG. 4.
Figure 8:
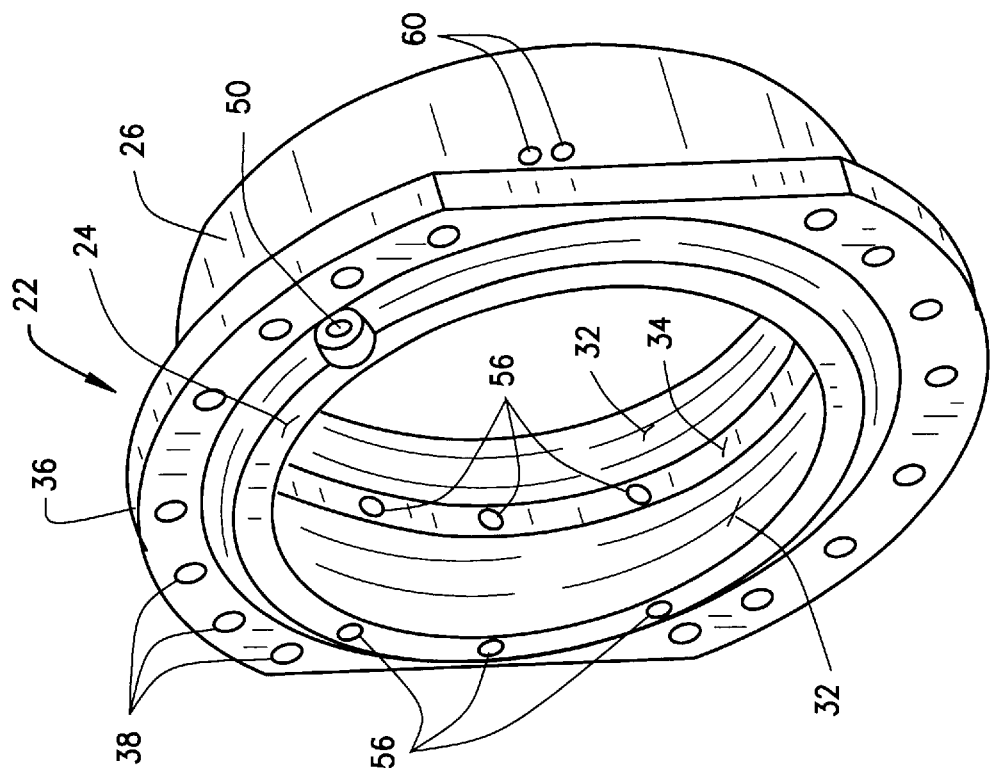
FIG. 8 is a second perspective view of the one-piece outer race.
Figure 7:
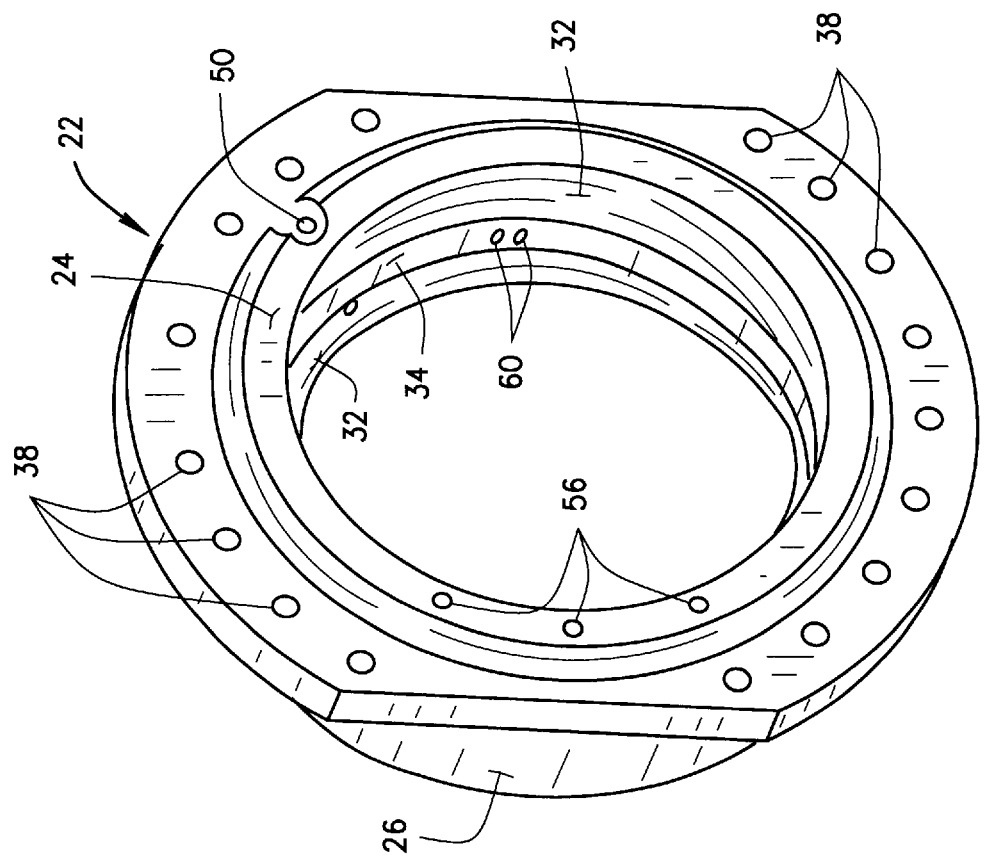
FIG. 7 is a first perspective view of the one-piece outer race.

The following detailed description illustrates the invention by way of example and not by way of limitation. This description will clearly enable one skilled in the art to make and use the invention, and describes what is presently believed to be the best mode of carrying out the invention.

A two-row bearing assembly 20 of the present invention is shown in FIGS. 2–9. The bearing assembly 20 has an inner surface 30 and outer surfaces including an outer race 22 having a front surface 24, an outer surface 26, and a back surface 28. The inner surface 30 has a pair of oppositely directed tapered surfaces 32 which define outer raceways. The outer raceways 32 do not meet at an angle; rather, a generally axial surface 34 extends between the axial inner ends of the raceways 32. A flange 36 extends outwardly from the side surface 26, spaced rearwardly slightly from the front surface 24. The flange 36 includes a plurality of bolt holes 38 spaced therearound.

An inner race 40 is made from a pair of rings 42. Each ring 42 has a tapered radial outer surface 44 defining an inner raceway. The inner raceways 44 are complimentary to the outer raceways 32.

A plurality of tapered rollers 46 are positioned between the inner raceways 44 and the outer raceways 32 to allow the inner and outer races to rotate relative to each other. Although the invention is shown and described using tapered rollers, cylindrical rollers, balls, or other types of rolling elements could be used.

As can be seen, unlike the prior art bearing assembly 1 of FIG. 1 in which the carrier and bearing cups were independent parts that had to be assembled together, the outer race 22 of the present invention is a single, unitary, one-piece element which defines the outer raceways of the bearing. By having a machined one-piece element, as opposed to two or more elements which must be assembled together, the problems associated with tolerance stack up from the assembly of parts is eliminated. Additionally, the time and cost of assembling the parts to form the outer race assembly is also eliminated. Typically, when a bearing cup is tight fitted into a housing or carrier, there is a small amount of distortion caused by the fit. In prior art designs (as shown in FIG. 1) in which a bearing cup is fitted into a cup carrier, the cup raceways conform to the cup carrier machining bore which could contain an out-of-round condition.. Integrating the cup raceways with the cup carrier into a unitary one-piece outer race, such as the outer race 22, improves the concentricity of the raceways.

To facilitate operation of the bearing during rotation, the bearing needs to be lubricated. In use, the bearing will typically be at least partially submerged in oil, or other flowable lubricant. The bearing will be submerged up to an oil level L. To introduce oil (or other lubricant) to the bearings, the outer race 22 includes a forced lubricant port 50 in the front surface 24 of the outer race 22. The port 50 can be countersunk, as seen in the FIGS., or formed in any other manner to facilitate connection of a lubrication line of a forced lubrication system to the port 50. The port 50 defines an L-shaped passage or channel having an axially extending passage 52 which communicates with a radial passage 54. The passages 52 and 54 are of generally constant diameter. The radial passage 54 opens up along the radial inner surface 34 of the outer race 22 between the outer raceways 32 and the rows of rollers. Unlike the prior art bearing 1, there is a single exit from the radial passage 54 of the forced lubrication port to the radial inner surface 34 of the outer race 22. The port 50 is preferably positioned to be above the oil level L and is in communication with a forced lubrication system having a source of lubricant to force lubricant to the bearings through the passages 52 and 54.

Additional secondary lubrication ports 56 define L-shaped secondary passages extending between the surface 34 between the outer raceways 32 and the front surface 24 of the outer race 22. The secondary passages are of generally constant diameter. Three secondary lubrication ports 56 are shown in the drawings. However, there could be one, two, or more than three secondary lubrication ports, as desired and required by the application. The secondary lubrication ports 56 are positioned to be below the oil level L when the bearing is installed in its application. As described below, the secondary lubrication ports and passages allow oil to passively enter the bearing to maintain a substantially constant level of oil within the bearing.

Radial tertiary lubrication ports 60 are also provided, and define radially extending tertiary passages between the outer side surface 26 and the surface 34 between the raceways 32 of the outer race 22. The tertiary passages are also of generally constant diameter. Two tertiary lubrication ports 60 are shown. However one or three or more tertiary lubrication ports could be provided, as may be needed by the particular application in which the bearing is being used. The tertiary lubrication ports 60 allow for oil flung from moving parts around the bearing to splash into the tertiary passages, and provide yet more oil lubrication at conditions where the forced oil system is not operating.

The outer race 22, which forms an integrated, unitary, one-piece cup carrier/bearing cup provides for an increased outer race section, having a distance or annular width d between the radial inner surface 34 and the radial outer or side surface 22. This greater distance allows for larger diameter lubrication ports throughout the bearing outer race to allow for higher oil flow rates, without sacrificing the integrity of the bearing components. For example, in a bearing outer race (see FIG. 6) having an inner diameter $D_i$ of about 9.875", an outer diameter $D_o$ of about 13.5", the distance d is about 1.8". The forced lubrication port 50 has diameter of about 0.45", and the secondary lubrication ports 56 and the radial tertiary lubrication ports 60 have diameters of about 0.47". Thus, the ports have a diameter which is equal to about $\frac{1}{4}^{th}$ of the distance d (or $D_o-D_i$). With ports of the noted sizes, the area of the three secondary ports on the bearing front surface is about 0.5 in$^2$; the area of the forced lubrication port is about 0.16 in$^1$; and the area presented by the two tertiary ports is about 0.35 in$^2$. There is an outer diameter-to-port diameter ratio of about 30:1 and an inner diameter-to-port diameter ratio of about 22:1. The size of the various ports, as well as the noted ratios, depends on several factors, including the size of the bearing, the viscosity of the lubricant, and the number of ports. For example, the secondary and tertiary ports 56 and 60 could be made smaller as the number of ports increases. Of course, the smallest acceptable diameter of the ports 56 and 60 would be limited by the viscosity of the lubricant to ensure the lubricant can flow through the ports.

Typically, the lubrication grooves 15 and radial passages 13 of prior art multi-row rolling element bearings had diameters of about 0.4" and about 0.315", respectively. Thus, the radial passages 13 had an entrance area in the bearing of about 0.08 n in$^2$, where n is the number of passages 13 in the bearing, and an inlet area of about 0.13 in$^2$. The lubrication inlet area provided by the forced lubrication port and the secondary lubrication ports (about 0.66 in$^2$) is much larger than the lubrication inlet area of the prior art bearing (0.13 in$^2$). As can be appreciated, the use of the single forced lubrication port and the secondary lubrication ports in combination provide for a larger flow of lubricant into the bearing 20 as compared to the lubrication system of the prior art bearing 1 of FIG. 1. Thus, as can be appreciated, the lubrication system of the bearing 20 allows for an easier flow of lubrication to the bearing, as compared to prior art bearings with the groove 15 and multiple holes 13 of the prior art bearing. Further, it is more difficult to form the groove 15 and holes 13 of the prior art bearing than it is to form the few passages of the bearing 20. Therefore, the assembly cost for producing the outer race 22 of the bearing 20 is less than the cost for producing the cup carrier of the prior art bearing.

Lastly, all the bearing race surfaces and rollers have enhanced surface finishes which form very smooth or fine surfaces for the raceways 32 and 44 and the rollers 46. This increases bearing performance by reducing the chance of surface initiated damage, especially during thin oil film conditions. The enhanced surface finishes can be accomplished by super finishing processes, or by other processes known in the art to create very smooth, fine surfaces for the rolling contacts between the raceways and the rollers.

FIG. 9 shows the bearing 20 mounted in an application A, such as a differential. As can be seen, the bearing 20 is mounted in a supporting structure S of the application A by a plurality of bolts 70 which pass through the bolt holes 38 (FIGS. 2 and 3) of the integral flange 36 of the outer race 22. A shaft, or other member, 72 is received in the center of the inner race 40, and may be covered with a plate 74. (The shaft 72 and plate 74 are seen more clearly in FIG. 1.) When mounted in the application A, the bearing 20 is partially submerged in a reservoir of oil, or other flowable lubricant, with the secondary lubrication ports 56 below the level L of oil in the application, and the radial tertiary lubrication ports 60 (not seen in FIG. 9) are above the oil level L. When the bearing 20 is in place, the forced lubrication port 50, which is connected to a forced lubrication system by a tube (not shown), is above the oil level L. When the bearing is submerged in the reservoir of oil, the oil enters into the bearing 20 through the secondary lubrication ports 56 and fills the bearing with oil to the oil level L. As the inner race 40 rotates relative to the outer race 22, the lubricant which enters the bearing 20 through the forced lubrication port 50 and the lubricant which enters the bearing through the secondary and tertiary ports 56 and 60 is forced out of the bearing, into the oil reservoir in which the bearing is at least partially submerged. Fluid flow dictates that fluids seek their own level. Thus, as oil is forced out of the bearing, oil flows back into the bearing through the secondary lubrication ports 56. Therefore, adequate oil is provided to the bearing at all times. The tertiary lubrication ports 60 allow for lubricant flung from moving parts in the application A surrounding the bearing to enter the bearing 20 to provide for additional lubrication.

Although the forced lubrication port 50 is the primary lubrication port, there are times, such as during cold starts, and when the forced lubrication system is not pumping lubricant, when the secondary lubrication ports 56 become the primary lubrication ports. That is, during cold starts and at other times when lubricant is not being pumped into the forced lubrication port, lubricant will still be able to enter the bearing through the secondary lubrication ports. Thus, the bearing will be lubricated during all periods of operation, including cold starts and at other times when lubricant is not being pumped into the forced lubrication port. As noted above, the secondary lubrication ports 56 are below the lubricant level L. The passive flow of lubricant through the secondary lubrication ports is enabled by the fact that the secondary lubrication ports are not connected to a lubricant pumping system which forces lubricant through the secondary lubrication ports 56. It is this lack of a pumping system for the secondary lubrication ports which allows for the bearing to lubricated at all times, even during cold starts. The tertiary lubrication ports 60 also facilitate lubrication of the bearing, as discussed above. The lubricant which enters the bearing through the tertiary lubrication ports 60 comes from lubrication which is flung from adjacent parts of the machine in which the bearing is installed. Thus, the tertiary lubrication ports 60 can be considered back-up lubrication ports, and do not become primary lubrication ports.

Figure 10:
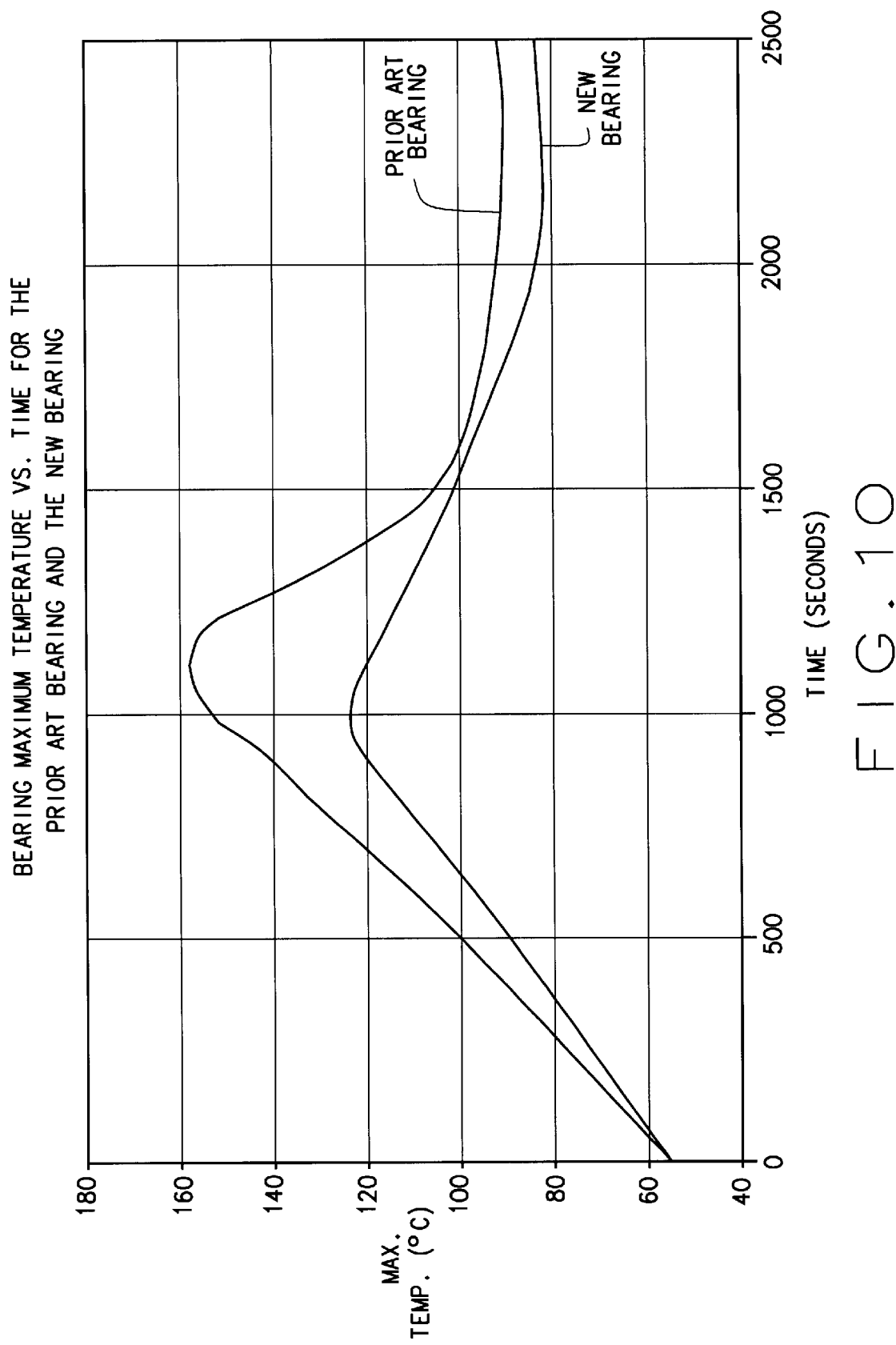
FIG. 10 is a chart comparing the maximum temperature vs. time plots of the prior art bearing assembly of FIG. 1 with the bearing assembly of the present invention.

A temperature comparison of the new bearing 20 with the prior art bearing 1 is shown in FIG. 10. The plot in FIG. 10 charts the maximum temperature of the bearings over time. As can be seen, the peak temperature of the new bearing 20 is substantially less than the peak temperature reached by the prior bearing 1. Additionally, the time spent at that peak temperature is less for the new bearing 20 than for the prior art bearing 1. Keeping the temperature spike low and of shorter durations can be critical. When bearings go through large temperature spikes, or if bearings are maintained at high temperatures for extended lengths of time, the useful life of the bearing can be reduced, or the bearing can prematurely fail. As can be seen in the graph of FIG. 10, the lubrication system of the bearing 20 not only reduces the maximum temperature attained by the bearing, but also reduces the time spent at that maximum temperature. Thus, the possibility of premature failure of the bearing, at least due to excessive operating temperatures, is reduced.

The term "about" is used in describing the various dimensions and ratios. The term "about" is meant to include a 10% margin. Thus, for example, the phrase "about 1" would include 0.9 to 1.1.

As various changes could be made in the above constructions without departing from the scope of the invention, it is intended that all matter contained in the above description or shown in the accompanying drawings shall be interpreted as illustrative and not in a limiting sense. For example, although the invention is described with respect to a two-row tapered roller bearing, it can find applicability in bearings with one row of bearings or with three or more rows of bearings or in bearings with other rolling elements, such as ball, cylindrical, spherical, etc. Additionally, the lubrication of the rollers via the ports 50, 56, and 60 can be accomplished with bearings having separate cup carriers and bearing cups, such as the bearing of FIG. 1. Depending on the application, the forced and secondary lubrication ports 50 and 56 could extend from the back surface 28 of the outer race 22, rather than the front surface 24. The tertiary lubrication ports 60 could be eliminated if desired. The bearing 20 is described for installation in a machine in a generally vertical orientation. However, the bearing could be installed in a generally horizontal orientation. In this case, the tertiary lubrication ports 60 would be on the front surface 24 of the bearing and the secondary lubrication ports 56 would be on the radial outer or side surface 26 of the bearing. Because the lubricant is pumped through the forced lubrication port, the location of the forced lubrication port can be on any of the outer surfaces of the bearing to facilitate connection of the forced lubrication port 50 to the forced lubrication system. These examples are merely illustrative.

What is claimed is:

1. A bearing assembly for accommodating rotation about a bearing axis, said bearing comprising an inner race defining an inner raceway, an outer race defining an outer raceway, and a plurality of rolling elements positioned between said inner and outer raceways; the outer race having a radial inner surface and outer surfaces including a front surface, a radial outer surface, and a back surface; said outer raceway being formed on said radial inner surface; said outer race further including:

a forced lubrication port connectable to a forced lubrication system for forced delivery of lubricant to said bearing; said forced lubrication port defining a first lubrication path extending from one of said outer surfaces to said radial inner surface; and at least one secondary lubrication port defining a second lubrication path extending from one of said outer surfaces to said radial inner surface; said secondary lubrication port defining an opening on said outer surface and being positioned on said bearing assembly to be submerged in a lubricant reservoir when the bearing is installed in an application to place said lubricant reservoir in fluid communication with the interior of said bearing assembly, said secondary lubrication port allowing for lubricant to passively enter said bearing to passively lubricate said bearing.

2. The bearing assembly of claim 1 wherein the outer race further includes at least one tertiary lubrication port extending from one of said outer surfaces to said radial inner surface.

3. The bearing assembly of claim 2 wherein said tertiary lubrication port is a radially extending port, said tertiary lubrication port extending from said radial outer surface to said radial inner surface.

4. The bearing assembly of claim 2 wherein said at least one tertiary lubrication port comprises two lubrication ports.

5. The bearing assembly of claim 1 wherein said bearing is a multi-row rolling element bearing: said inner surface of said outer race defining at least two outer raceways; said outer surface of said inner race defining at least two inner raceways, said rolling elements being formed in at least two rows between said inner and outer raceways; said forced lubrication port and said at least one secondary lubrication port extending to said outer race radial inner surface at a point between said rows of rolling elements.

6. The bearing assembly of claim 1 wherein there is only one forced lubrication port, said forced lubrication port having a single exit into said bearing.

7. The bearing assembly of claim 1 wherein said forced lubrication port and said at least one secondary lubrication port have diameters approximately equal to about $\frac{1}{4}^{th}$ of the annular width of the outer race.

8. The bearing assembly of claim 1 wherein said at least one secondary lubrication port comprises two or more secondary lubrication ports.

9. The bearing assembly of claim 1 wherein the outer race is an integral, one-piece, unitary element which includes an integral flange for mounting of the bearing in an application and the outer raceway.

10. The bearing assembly of claim 1 wherein said secondary lubrication port is not connected to a lubricant pumping system.

11. A bearing assembly for accommodating rotation about a bearing axis, said bearing comprising an inner race defining an inner raceway, an outer race defining an outer raceway, and a plurality of rolling elements positioned between said inner and outer raceways; the outer race having a radial inner surface and outer surfaces including a front surface, a radial outer surface, and a back surface; said outer raceway being formed on said radial inner surface; said outer race further including:

a forced lubrication port connectable to a forced lubrication system for forced delivery of lubricant to said bearing; said forced lubrication port defining a first lubrication path extending from one of said outer surfaces to said radial inner surface; and at least one secondary lubrication port defining a second lubrication path extending from one of said outer surfaces to said radial inner surface;

wherein at least one of said forced and secondary lubrication ports extends from one of said front and back surfaces of said outer race to said radial inner surface of said outer race.

12. A multi-row rolling element bearing assembly for accommodating rotation about a bearing axis, said bearing comprising an inner race defining at least two inner raceways, an outer race defining at least two outer raceways, and a plurality of rolling elements positioned between said inner and outer raceways, said rolling elements being formed in at least two rows; the outer race having a radial inner surface and outer surfaces including a front surface, a radial outer surface, and a back surface; said at least two outer raceways being formed on said radial inner surface; said outer race further including:

a forced lubrication port connectable to a forced lubrication system for forced delivery of lubricant to said bearing; said forced lubrication port defining a first lubrication path extending from one of said outer surfaces to said radial inner surface at a point between said outer raceways;

at least one secondary lubrication port defining a second lubrication path extending from one of said outer surfaces to said radial inner surface at a point between the two outer raceways; and at least one tertiary lubrication port extending from one of said outer surfaces to said radial inner surface at a point between the two outer raceways.

13. The multi-row rolling element bearing assembly of claim 12 wherein said forced lubrication port extends from one of said front and back surfaces of the outer race; said at least one secondary lubrication port extends from one of said front and back surfaces of the outer race; and said tertiary lubrication port extends from said radial outer surface of said outer race.

14. The multi-row rolling element bearing of claim 12 wherein said bearing includes only one forced lubrication port; said forced lubrication port being sized to allow sufficient flow of lubricant to said bearing.

15. The multi-row rolling element bearing of claim 14 wherein said forced lubrication port and at least one secondary lubrication port have diameters equal to about ¼$^{th}$ of the annular width of the outer race.

16. In a machine having a supporting structure, a rolling element bearing mounted to said supporting structure, and a member received in said bearing to rotate relative to said supporting structure; said rolling element bearing including an outer race including an outer raceway, an inner race including an inner raceway, and a plurality of rolling elements positioned between said inner and outer raceways; said machine including a reservoir of flowable lubricant; said bearing being at least partially submerged in said reservoir of lubricant up to a desired lubricant level; the improvement comprising a lubrication system for said bearing; said lubrication system including:

a forced lubrication port extending from an outer surface of said bearing to one of said raceways and connectable to a forced lubrication system to deliver lubricant to said rolling elements; and at least one secondary lubrication port extending from an outer surface of said bearing to one of said raceways; said at least one secondary lubrication port being positioned on said bearing to be below the lubricant level and being submerged in said lubricant to allow lubricant to passively pass through said at least one secondary lubrication port into said bearing.

17. The improvement of claim 16 wherein said improvement comprises a tertiary lubrication port above said lubricant level extending from an outer surface of said bearing deliver lubricant flung from other parts of said machine in the vicinity of said bearing to said rolling elements.

18. The improvement of claim 16 wherein said bearing is a multi-row rolling element bearing having at least two outer raceways; said outer race being a unitary, one-piece element having a circumferential outer surface, a flange extending from said outer surface for mounting said bearing to said support structure, and a radial inner surface; said at least two outer raceways being formed on said inner surface.

19. The improvement of claim 18 wherein said lubrication system includes only one forced lubrication port on the radial inner surface of the outer race.

20. An outer race for a multi-row rolling element bearing; said outer race being a unitary, one-piece element having a circumferential outer surface, a flange extending from said outer surface for mounting said bearing to a support structure, and a radial inner surface; said outer race having at least two outer raceways formed on said radial inner surface; the outer race further including:

a forced lubrication port connectable to a forced lubrication system for forced delivery of lubricant to said bearing; said forced lubrication port defining a first lubrication path extending from one of said outer surfaces to said radial inner surface; and at least one secondary lubrication port defining a second lubrication path extending from one of said outer surfaces to said radial inner surface.

* * * * *